United States Patent
Suzaki

(10) Patent No.: US 6,307,954 B1
(45) Date of Patent: Oct. 23, 2001

(54) EYE IMAGE RECOGNITION METHOD, EYE IMAGE SELECTION METHOD AND SYSTEM THEREFOR

(75) Inventor: Masahiko Suzaki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/498,484

(22) Filed: Feb. 4, 2000

Related U.S. Application Data

(62) Division of application No. 09/046,506, filed on Mar. 24, 1998, now Pat. No. 6,215,891.

(30) Foreign Application Priority Data

| Mar. 26, 1997 | (JP) | 9-073745 |
| Mar. 28, 1997 | (JP) | 9-094546 |
| Nov. 17, 1997 | (JP) | 9-332445 |

(51) Int. Cl.[7] .................................................. G06K 9/00
(52) U.S. Cl. .................................................... 382/117
(58) Field of Search .................................... 382/117, 118, 382/115–116, 286, 288; 348/78; 351/204, 206, 208, 211, 212

(56) References Cited

U.S. PATENT DOCUMENTS

| 4,641,349 | * | 2/1987 | Flom et al. | 382/117 |
| 4,975,969 | * | 12/1990 | Tai | 382/117 |
| 5,068,746 |   | 11/1991 | Ohsawa et al. | 358/443 |
| 5,231,674 |   | 7/1993 | Cleveland et al. | 382/117 |
| 5,291,560 | * | 3/1994 | Dugman | 382/117 |
| 5,432,866 | * | 7/1995 | Sakamoto | 382/117 |
| 5,548,355 |   | 8/1996 | Iki | 351/212 |
| 5,801,763 |   | 9/1998 | Suzuki | 348/77 |
| 5,953,440 | * | 9/1999 | Zhang et al. | 382/117 |
| 6,069,967 |   | 5/2000 | Rozmus et al. | 382/117 |
| 6,081,607 | * | 6/2000 | Mori et al. | 382/117 |

FOREIGN PATENT DOCUMENTS 4-264985A    9/1992  (JP) .

* cited by examiner

*Primary Examiner*—Bhavesh Mehta
(74) *Attorney, Agent, or Firm*—Venable; Robert J. Frank; Allen Wood

(57) ABSTRACT

An input image that includes an eye is divided into a plurality of blocks, and a mosaic image in which each of the blocks has a density value is produced. Among all the blocks, one having a small distance from a center point of the mosaic image and having a small density value is determined to be a block including the center of the pupil of the eye. Then, based on the determined block, a center position of the pupil in the input image is derived. Based on the density value of the block including the center of the pupil, a density threshold value is set. Then, based on the density threshold value, a two-valued image is produced from the input image. Among regions in the two-valued image which are darker than the density threshold value, one including the center position of the pupil is extracted as a pupil region.

5 Claims, 10 Drawing Sheets

EYE IMAGE RECOGNITION METHOD, EYE IMAGE SELECTION METHOD AND SYSTEM THEREFOR

CROSS-REFERENCE TO RELATED APPLICATION

This application is a division of U.S. application Ser. No. 09/046,506, filed Mar. 24, 1998, now U.S. Pat. No. 6,215,891, the disclosure of which is incorporated herein by reference.

BACKGROUND OF THE INVENTION

1. Field of the Invention

The present invention relates to an eye image recognition method for extracting a region of a pupil of an eye from a captured image including the eye, and further relates to eye image selection method and system for selecting an image including eye data about a pupil and its peripheral portion of an eye from among consecutively captured images each including the eye. The eye data is used for individual identification of an animal, such as a human being, a horse or a cow.

2. Description of the Related Art

A technique is disclosed, for example, in JP-A-4-264985, for carrying out individual identification based on a human face. In the disclosed technique, regions of the eyes, nose and so on are individually extracted from an input image of the whole face, captured by a camera, so as to be subjected to identification processes, respectively. For locating, for example, the eye region to be extracted, a rectangular region is preset in the input face image and projected in vertical and horizontal directions, and positions having the minimum luminance value in the projected regions are considered to define the center of the eye.

In the foregoing technique, it is necessary that the human face is adequately positioned relative to the camera so that the eyes and so forth can be present in the corresponding preset rectangular regions.

However, in practice, human faces are not always positioned adequately relative to cameras, and further, it is almost impossible to adequately position faces of other animals relative to cameras. Thus, for automatically searching out the position of an eye for extraction, it is necessary to select an image, which includes the eye in a preset region, from a number of consecutively captured images.

In view of this, a technique has been demanded which can achieve automatic selection of such an image from the consecutively captured images.

On the other hand, when carrying out individual identification using eye data of a human being or an animal of another kind, it is necessary to use an enlarged image of an eye for obtaining as many eye data as possible. However, in the enlarged eye image, those portions, such as an eyebrow, eyelashes, a mole and a shadow, may appear as regions having the same or like density (luminance) values as a pupil of the eye. Therefore, it is difficult to identify a region of the pupil only based on density data, such as differences in density.

Specifically, as shown in FIG. 2, an eyebrow, eyelashes and a mole exist in an image of an eye as regions having the same or like density values as the pupil of the eye. Accordingly, when the image is simply projected in vertical and horizontal directions, a plurality of minimum value regions are located so that it is difficult to extract only the region of the pupil with accuracy.

In view of this, a technique has been demanded which can extract the pupil region with accuracy even if the input image includes portions having the same or like density values as the pupil region.

SUMMARY OF THE INVENTION

Therefore, it is an object of the present invention to provide an improved eye image recognition method.

It is another object of the present invention to provide an improved eye image selection method.

It is still another object of the present invention to provide an improved eye image selection system.

According to one aspect of the present invention, an eye image recognition method comprises the steps of dividing an input image including an eye into a plurality of blocks; producing a mosaic image with the blocks each representing a density value; and determining that one of the blocks having a small distance from a center point of the mosaic image and having a small density value is the block including a center position of a pupil of the eye.

It may be arranged that the method further comprises the steps of setting a threshold value based on the density value of the determined block; converting the input image into a two-valued image using the threshold value as a criterion; and extracting, as a pupil region, a region of the two-valued image including the center position of the pupil.

According to another aspect of the present invention, an eye image selection method comprises the steps of locating a center position of a pupil of an eye from an input image including the eye; and determining that, if a distance between the center position of the pupil and a center position of the input image is not greater than a preset value, the input image includes necessary eye data for carrying out individual identification, and selecting the input image.

It may be arranged that the method further comprises the steps of dividing the input image into a plurality of blocks; producing a mosaic image with the blocks each representing a density value; determining one of the blocks having a small distance from a center point of the mosaic image and having a small density value; and locating the center position of the pupil based on the determined block.

According to another aspect of the present invention, an eye image selection method comprises the steps of locating a center position of a pupil of an eye from an input image including the eye; and determining that, if a density of a region including the center position is not greater than a given value, the input image includes the pupil necessary for carrying out individual identification, and selecting the input image.

It may be arranged that the method further comprises the steps of dividing the input image into a plurality of blocks; producing a mosaic image with the blocks each representing a density value; determining one of the blocks having a small distance from a center point of the mosaic image and having a small density value; and locating the center position of the pupil based on the determined block.

According to another aspect of the present invention, an eye image selection method comprises the steps of dividing an input image including an eye into a plurality of blocks; producing a mosaic image with the blocks each representing a density value; determining that one of the blocks having a small distance from a center point of the mosaic image and having a small density value is a block including a center position of a pupil of the eye; locating the center position of the pupil from the determined block; and selecting the input image if a distance between the center position of the pupil and a center position of the input image is not greater than a preset value and if a density of a region including the center position of the pupil is not greater than a preset value.

According to another aspect of the present invention, an eye image selecting method of selecting an input image for individual identification from a plurality of input images each including an eye, the method comprises the steps of locating, in the input image, a region of a specular reflection image appearing in the eye due to a light source upon capturing the input image; and selecting the input image when the region satisfies a preset condition.

It may be arranged that the preset condition is whether the region exists in a preset range of the input image.

It may be arranged that the preset condition is whether a size of the region is in a preset range.

It may be arranged that the preset condition includes an approximation of a shape of the region relative to a shape of the light source.

It may be arranged that the preset condition includes an edge intensity of a contour of the region relative to a threshold value.

It may be arranged that the preset condition is whether a density value of a region around the region of the specular reflection image is smaller than a threshold value.

It may be arranged that the region of the specular reflection image is located by locating regions having density values greater than a threshold value in the input image and by selecting one of the located regions as appearing on a cornea of the eye when none of the other located regions exist in the neighborhood of the one of the located regions.

It may be arranged that the region of the specular reflection image is located by locating regions having density values greater than a threshold value in the input image and by selecting one of the located regions as appearing on a cornea of the eye when a mean density value of a region around the one of the located regions is smaller than any of mean density values of regions around the other located regions.

It may be arranged that the preset condition includes at least one of first to fifth conditions, the first condition being whether the region exists in a preset range of the input image, the second condition being whether a size of the region is in a preset range, the third condition including an approximation of a shape of the region relative to a shape of the light source, the fourth condition including an edge intensity of a contour of the region relative to a threshold value, and the fifth condition being whether a density value of a region around the region of the specular reflection image is smaller than a threshold value.

According to another aspect of the present invention, an eye image selection system for selecting an input image for individual identification from a plurality of input images each including an eye, comprises an image determining section for locating, in the input image, a region of a specular reflection image appearing in the eye due to a light source upon capturing the input image, and determining whether the region satisfies a preset condition.

It may be arranged that the image determining section includes at least one of a region existence determining means for determining whether the region exists in a preset range of the input image; a size determining means for determining whether a size of the region is in a preset range; an approximation determining means for determining an approximation of a shape of the region relative to a shape of the light source; an edge intensity determining means for determining an edge intensity of a contour of the region relative to a threshold value; and a density determining means for determining whether a density value of a region around the region of the specular reflection image is smaller than a threshold value.

BRIEF DESCRIPTION OF THE DRAWINGS

The present invention will be understood more fully from the detailed description given hereinbelow, taken in conjunction with the accompanying drawings.

In the drawings:

FIGS. 4A and 4B are diagrams for explaining a mosaic image producing process and a pupil center locating process in the eye image recognition method shown in FIG. 1, wherein FIG. 4A shows an input image and FIG. 4B shows the mosaic image produced from the input image;

FIGS. 5A and 5B are diagrams for explaining labeling to a two-valued image in the eye image recognition method shown in FIG. 1, wherein FIG. 5A shows the two-valued image before labeling and FIG. 5B shows the two-valued image after labeling;

DESCRIPTION OF THE PREFERRED EMBODIMENTS

Now, preferred embodiments of the present invention will be described hereinbelow with reference to the accompanying drawings.

FIRST EMBODIMENT

Figure 1:
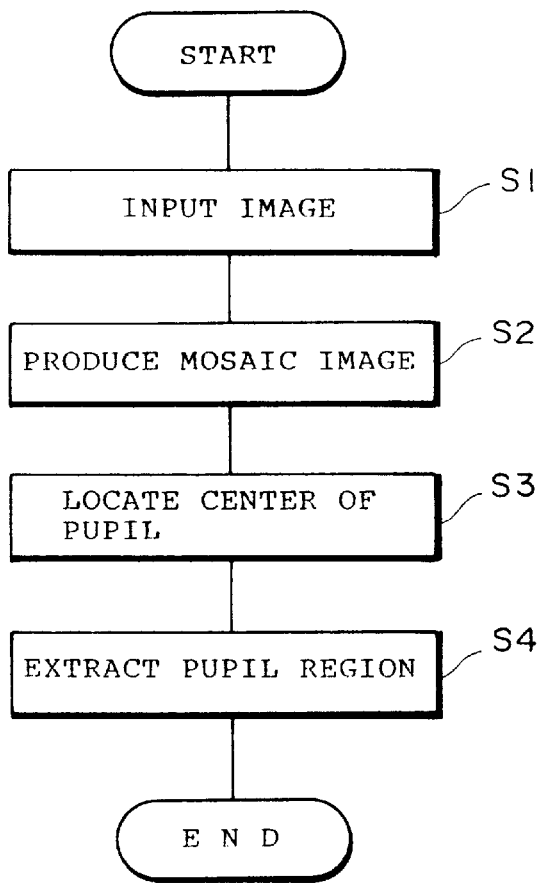
FIG. 1 is a flowchart showing an eye image recognition method according to a first preferred embodiment of the present invention.
Figure 3:
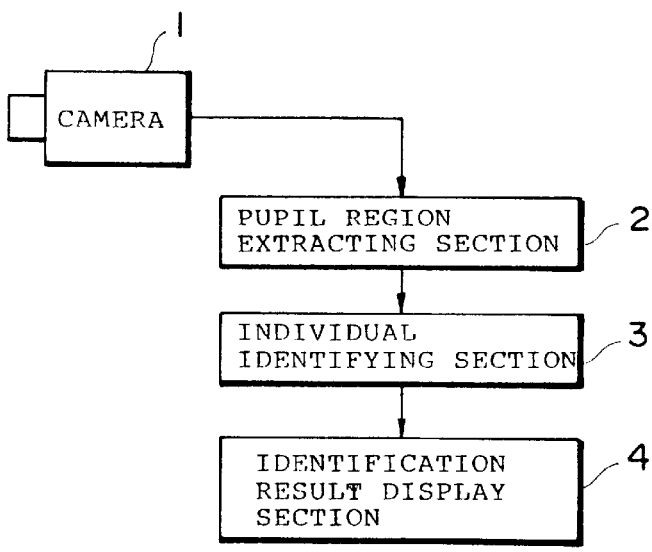
FIG. 3 is a block diagram showing a structure of an eye image recognition system for carrying out the method shown in FIG. 1.

FIG. 1 is a flowchart showing an eye image recognition method according to the first preferred embodiment of the present invention, and FIG. 3 is a block diagram showing the structure of an eye image recognition system for carrying out the method shown in FIG. 1.

Figure 2:
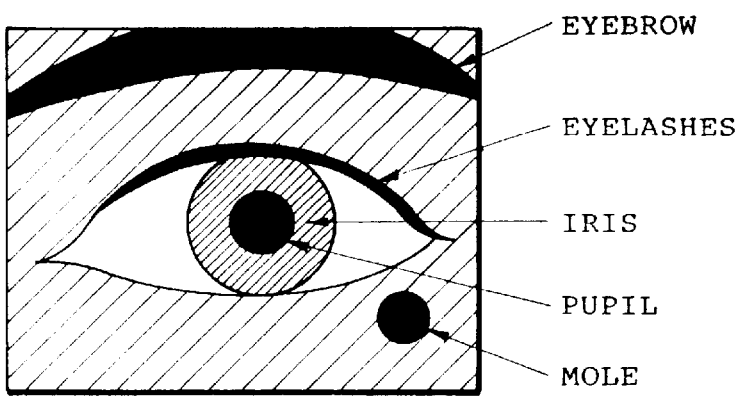
FIG. 2 is a diagram for explaining an image of a human eye.

In FIG. 3, the system comprises an image input section (camera) 1, a pupil region extracting section 2, an individual identifying section 3 and an identification result display section 4. The image input section 1 is in the form of a camera for capturing an image of an eye of an animal, such as a human being, a horse or a cow. The image from the image input section 1 is digitized and inputted to the pupil region extracting section 2. It is assumed that, as shown in FIG. 2, the input image includes a pupil and is mostly occupied by an eye on the whole.

The pupil region extracting section 2 carries out an extraction process for extracting a region of the pupil from the input image and transfers the result of the extraction process along with the input image to the individual identifying section 3. Based on them, the individual identifying section 3 carries out an identification process for the input image in a known manner. Specifically, the individual identifying section 3 uses the result of the extraction process, that is, positional data about the pupil region, for extracting an iris region for a human being and irial granules for a horse or the like so as to carry out the identification process based on acquired necessary eye data in the known manner. The identification result display section 4 displays the result of the identification process.

Now, the operation of the system shown in FIG. 3 will be described with reference to the flowchart shown in FIG. 1, wherein a human eye is dealt with as an example.

First at step S1, an image of a human eye captured by the camera (image input section) 1 is digitized and inputted to the pupil region extracting section 2. The pupil region extracting section 2 uses the input image for producing a mosaic image at step S2 and locating the center of the pupil at step S3.

Figure 4A:
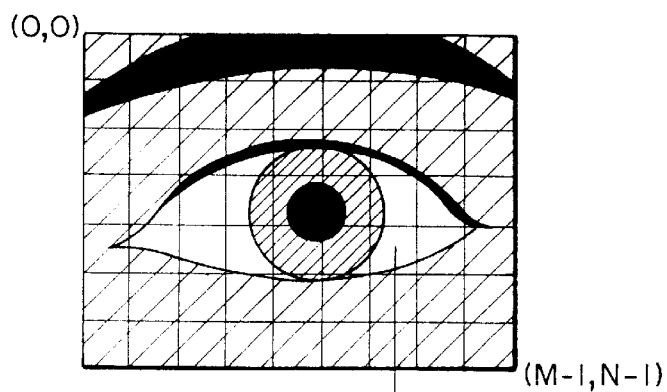
Figure 4B:
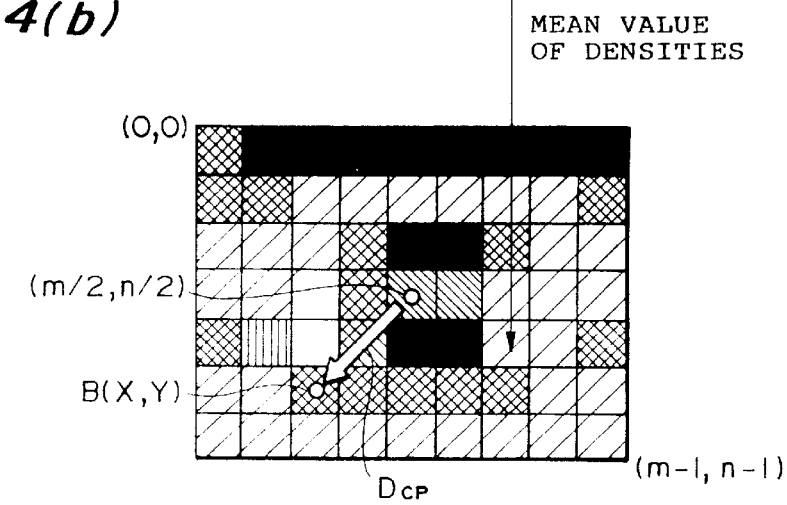

FIGS. 4A and 4B are diagrams for explaining a mosaic image producing process and a pupil center locating process, wherein FIG. 4A shows the input image and FIG. 4B shows the mosaic image produced from the input image shown in FIG. 4A.

First, the input image shown in FIG. 4A is divided into a given number of blocks, and then, a density value of each block is derived as a mean value of density values of input pixels in a corresponding region of the input image, so that the mosaic image shown in FIG. 4B is obtained. The density value represents a luminance value so that when the density value is greater (density is higher), a corresponding portion is seen brighter. Assuming that the size of the input image is M×N (M and N are natural numbers representing the numbers of pixels of the input image in the x-axis and y-axis directions, respectively), a density value of each input pixel is represented by I(x, y) (0≦x<M, 0≦y<N: x and y represent x- and y-coordinates of each input pixel, respectively), the size of the mosaic image is m×n (m<<M, n<<N: m and n are small natural numbers of about 5 to 20 representing the numbers of blocks of the mosaic image the x-axis and y-axis directions, respectively), and a density value of each block is represented by S(X, Y) (0≦X<m, 0≦Y<n: X and Y represent x- and y-coordinates of each block, respectively, and more precisely, X and Y represent the x- and y-coordinates of an upper-left corner among four corners of each block, respectively), S(X, Y) is given by the following equation (1):

$$S(X, Y) = \frac{1}{M/m \times N/n} \sum_{x=X \times M/m}^{(X+1) \times M/m} \sum_{y=Y \times N/n}^{(Y+1) \times N/n} I(x, y) \quad (1)$$

At step S2, the mosaic image shown in FIG. 4B is obtained based on the equation (1). As will be appreciated, step S2 is a process for converting the M×N pixels of the input image into the m×n blocks of the mosaic image.

Now, a pupil approximation P(X, Y) (0≦X<m, 0≦Y<n) is given by the following equation (2) for each block of the mosaic image:

$$P(X, Y) = \frac{1}{(Dcp)^\alpha \times S(X, Y)} \quad (2)$$

wherein Dcp represents a distance between the center coordinates C=(m/2, n/2) of the mosaic image and an upper-left corner of a corresponding block B(X, Y), and a represents a given constant greater than 1.

Dcp is given by the following equation (3):

$$Dcp = \begin{cases} \sqrt{\left(\frac{m}{2} - X\right)^2 + \left(\frac{n}{2} - Y\right)^2} & \text{if } \left(\frac{m}{2} - X\right)^2 + \left(\frac{n}{2} - Y\right)^2 > 1 \\ 1 & \text{else} \end{cases} \quad (3)$$

In the equation (3), X and Y may be given as (X+0.5) and (Y+0.5), respectively. In this case, Dcp represents the distance between the center coordinates C=(m/2, n/2) of the mosaic image and the center of the block B.

As seen from the equations (2) and (3), the pupil approximation P(X, Y) satisfies the following two conditions:

P(X, Y) becomes greater as a density value S(X, Y) of a corresponding block of the mosaic image becomes smaller;

P(X, Y) of a block closer to the center of the mosaic image becomes greater.

In view of the foregoing two conditions, a center position of the pupil in the mosaic image exists in a block representing the greatest value Ppupil (Xmax, Ymax) among values P(X, Y) as given by:

Ppupil (Xmax, Ymax)≧P(X, Y) (X, Y|0≦X<m, 0≦Y<n)   (4)

wherein Xmax and Ymax represent the coordinates of (an upper-left corner of) a block representing the greatest P(X, Y).

The foregoing two conditions are determined since the pupil is normally located at the center in the image when aiming to photograph the eye and since the pupil is the darkest place in the eye.

Then, a center position Cpupil (Cx, Cy) of the pupil in the input image is given by:

Cpupil (Cx, Cy)=((Xmax+0.5)×M/m, (Ymax+0.5)×N/n)   (5)

wherein 0.5 is added to Xnax and Ymax, respectively, for conversion into x- and y-coordinates of the pixel in the input image after shifting values of Xmax and Ymax to the center of the corresponding block.

The foregoing pupil center locating process is executed at step S3.

Subsequently, at step S4, the pupil region extracting section 2 carries out a pupil region extracting process for extracting a region of the pupil from the input image based on the data derived in the pupil center locating process at step S3. Hereinbelow, the pupil region extracting process will be described.

First, a threshold value Tp is derived from the density value S(Xmax, Ymax) of the block of the center position of the pupil in the mosaic image, using an equation (6) given by:

$$Tp = \beta \times S(Xmax, Ymax) \quad (6)$$

wherein β is a constant (0<β<1) representing a real number of about 0.5 to 0.7.

Then, using the derived threshold value Tp, the density values I(x, y) of the input image (pixels) are two-valued to obtain a two-valued image having pixel values D(x, y). The pixel values D(x, y) of the two-valued image are 1 when I(x, y)>Tp, and otherwise 0 (zero) as seen from an equation (7) as given by:

$$D(x, y) = \begin{cases} 1 & \text{if } I(x, y) > Tp \\ 0 & \text{else} \end{cases} \quad (7)$$

Further, labeling is carried out relative to the two-valued pixels whose D(x, y) are 0.

Figure 5A:
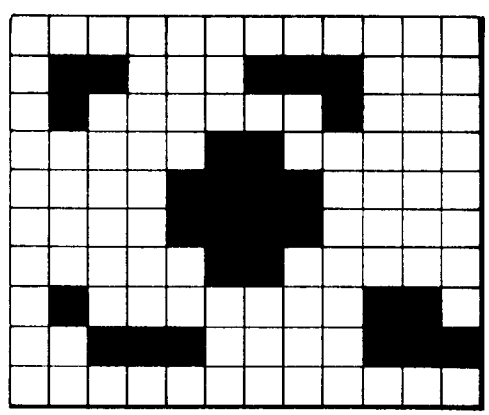
Figure 5B:
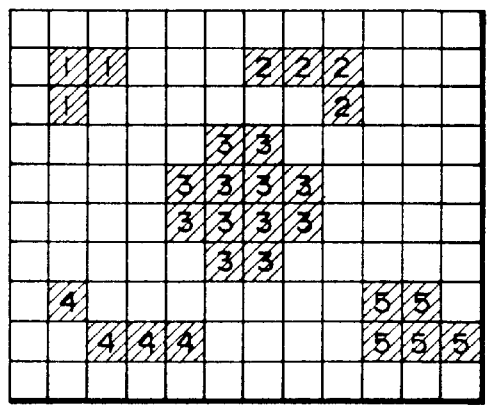

FIGS. 5A and 5B are diagrams for explaining the labeling to the two-valued image, wherein FIG. 5A shows the two-valued image before labeling and FIG. 5B shows the two-valued image after labeling. Specifically, assuming that D(x, y)=0 in black regions in FIG. 5A, the labeling is carried out as shown in FIG. 5B, that is, by assigning the same labels to a pixel whose D(x, y) is 0 and an adjacent pixel whose D(x, y) is also 0. Then, among the labeled regions each defined by the same labels, such a labeled region including the foregoing center coordinates Cpupil (Cx, Cy) of the pupil is extracted as the pupil region.

Thereafter, based on the obtained pupil region, the individual identifying section 3 carries out the identification process in the known manner and displays the result thereof at the identification result display section 4.

Although the foregoing explanation relates to the human eye, the eye image recognition method shown in FIG. 1 is also applicable to an eye of an animal of another kind, such as a horse or a cow.

Further, it may be arranged that an image of an eye is received via a network and inputted to the pupil region extracting section 2.

Further, m and n representing the numbers of blocks of the mosaic image may have values other than about 5 to 20 according to necessity.

Further, although the density value of each block is derived as the mean value of the density values of the input pixels in the corresponding region of the input image, it may be derived differently.

As described above, according to the foregoing first preferred embodiment, the pupil region of the eye can be extracted with accuracy from the input image even including an eyebrow, eyelashes, a mole or the like in the neighborhood of the eye or even including the eye at a position offset from the center of the image. Thus, eye data necessary for carrying out the individual identification can be easily obtained.

SECOND EMBODIMENT

The second preferred embodiment carries out the pupil center locating process in the foregoing first preferred embodiment so as to select from among consecutively captured images an image which includes necessary eye data for carrying out the individual identification.

Figure 6:
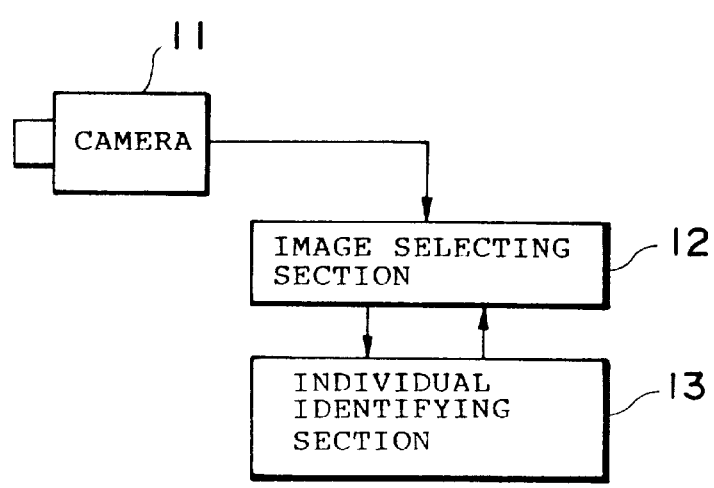
FIG. 6 is a block diagram showing the structure of an eye image selection system according to a second preferred embodiment of the present invention.

FIG. 6 is a block diagram showing the structure of an eye image selection system according to the second preferred embodiment of the present invention.

In FIG. 6, the system comprises an image input section (camera) 11, an image selecting section 12 and an individual identifying section 13. The image input section 11 is in the form of a video camera for capturing video images of an eye of a naturally moving animal, such as a human being, a horse or a cow, in consecutive image frames. The images from the image input section 11 are digitized and inputted to the image selecting section 12 per frame. The image selecting section 12 processes the one-frame input image so as to determine whether the input image adequately includes the eye. The individual identifying section 13 carries out the individual identification relative to the image determined by the image selecting section 12 to adequately include the eye. If the individual identifying section 13 fails in its identification process, it requests the image selecting section 12 to send another image. This process is repeated until the identification process is successfully carried out.

Figure 7:
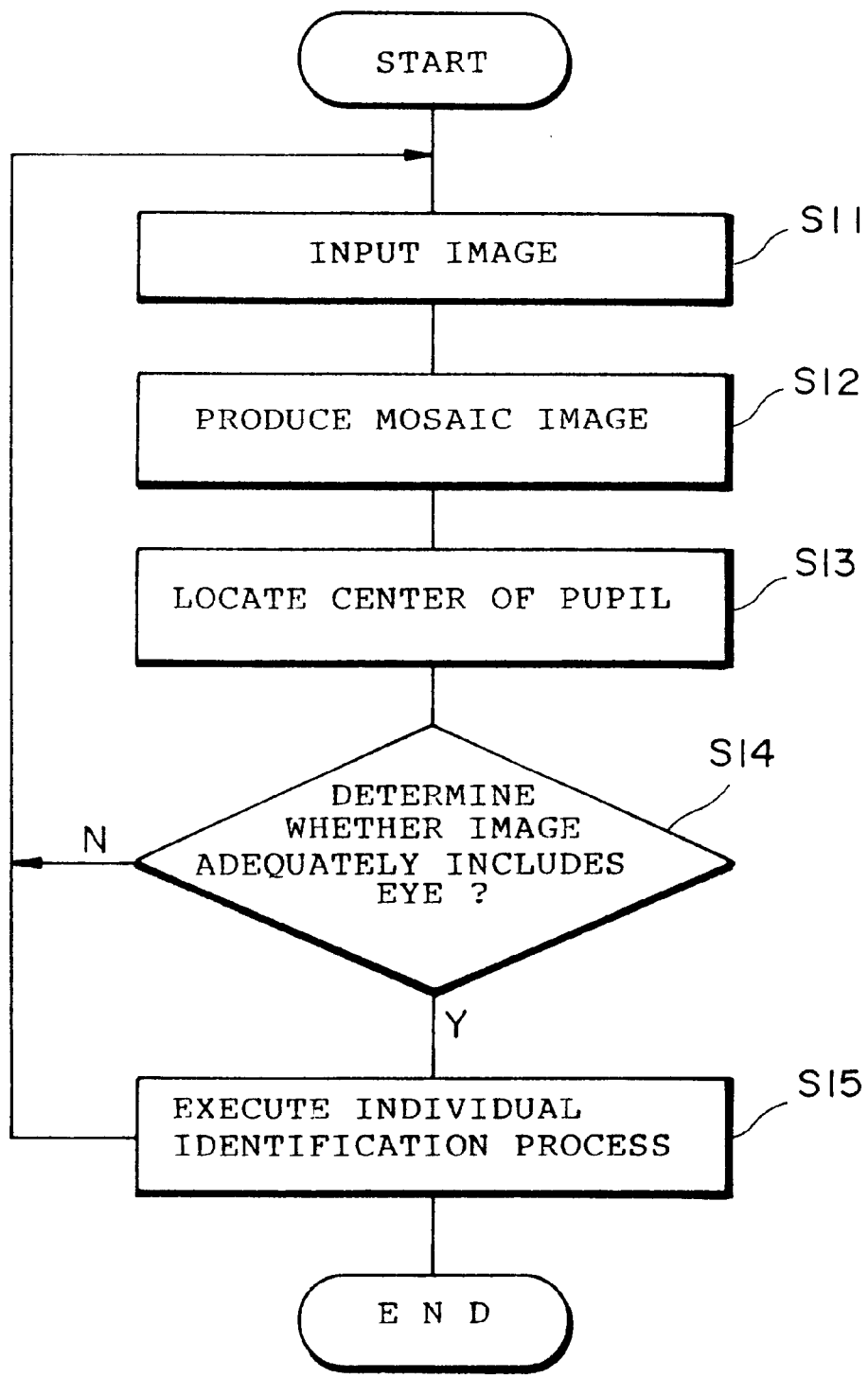
FIG. 7 is a flowchart showing the operation of the system shown in FIG. 6.

FIG. 7 is a flowchart showing an operation of the system shown in FIG. 6.

First at step S11, video images of a face including an eye of, for example, a human being are captured by the image input section 11 and then digitized and inputted to the image selecting section 12 per frame. Subsequently, the image selecting section 12 produces a mosaic image based on the one-frame input image at step S12 and then locates a center position (Xmax, Ymax) of the pupil in the mosaic image at step S13. Since the processes at steps S12 and S13 are the same as those in the foregoing first preferred embodiment, explanation thereof is omitted here. When the center position (Xmax, Ymax) of the pupil in the mosaic image is derived, step S4 determines whether the input image adequately includes the eye.

The determination as to whether the input image adequately includes the eye is carried out based on the following first and second conditions:

whether a distance Dcppupil between the center coordinates C=(m/2, n/2) of the mosaic image and the center position (Xmax, Ymax), that is, an upper-left corner of a block B(Xmax, Ymax), is not greater than a threshold value Tdist, wherein $Dcp_{pupil}$ is given by:

$$Dcp_{pupil} = \sqrt{\left(\frac{m}{2} - X\max\right)^2 + \left(\frac{n}{2} - Y\max\right)^2}$$

whether a density value S(Xmax, Ymax) of the block B(Xmax, Ymax) is not greater than a threshold value $T_{dens}$.

If the foregoing first and second conditions are satisfied, step S14 determines that the input image adequately includes the eye, so that the individual identifying section 13 carries out the individual identification process relative to the input image at step S15.

In the foregoing first condition, the threshold value $T_{dist}$ is a determining criterion for a distance. Specifically, for satisfying a condition that eye data necessary for carrying out the individual identification process exists in the input image, it is necessary to determine a positional range in the input image where the pupil should be located. For example, if the pupil is located far away from the center of the input image, it is possible that an iris region around the pupil protrudes from the input image. If that is the case, it is impossible to carry out the individual identification procedure using the iris portion as a descriptor. Accordingly, the threshold value $T_{dist}$ is set to a proper distance value for allowing the necessary eye data for the individual identification to be included in the input image, knowing in advance the size of the eye appearing in the input image.

On the other hand, in the foregoing second condition, the threshold value Tdens is a density criterion for carrying out the individual identification process. Specifically, since the density values is the smallest (darkest) at the pupil region in the eye, unless the density value of the pupil region is not greater than a certain value, density contrast data becomes insufficient so that necessary eye data can not be obtained to a sufficient level. Accordingly, the threshold value Tdens is set to a proper density value as the maximum density value of the pupil region.

In this embodiment, the center position of the pupil is derived in the same manner as in the foregoing first preferred embodiment. However, the center position of the pupil may be derived in a different manner and used for the selection of the image.

As described above, according to the foregoing second preferred embodiment, the image including the necessary eye data for the individual identification can be selected from among the consecutive images capturing the eye of a human being or an animal of another kind during natural movement thereof. Thus, the individual identification can be carried out with no otherwise required unnecessary process and thus in a shorter time, and further with higher identification accuracy.

Each of the foregoing eye image ignition and selection methods in the first and second preferred embodiments can be realized by a computer control based on a corresponding program. Specifically, each of those methods may be realized by storing such a program into a storage medium, such as a flexible disk or a CD-ROM, and then installing it into a computer, or by downloading it into the computer via a network.

THIRD EMBODIMENT

Figure 9:
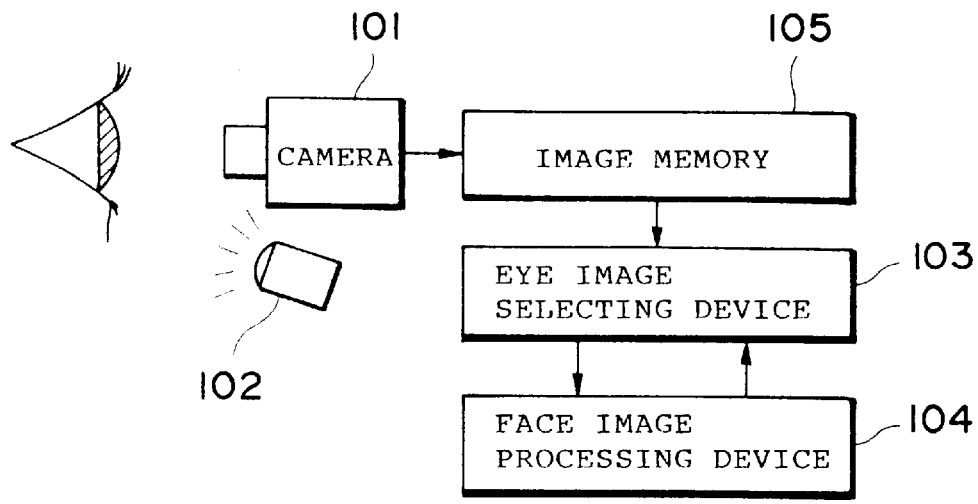
FIG. 9 is a block diagram showing a system that includes an eye image selection system for carrying out the method shown in FIG. 8.

FIG. 9 is a block diagram showing the structure of an image processing system including an eye image selection system according to the third preferred embodiment of the present invention.

In FIG. 9, the image processing system comprises a video camera 101, a light source 102, an image memory 105, an eye image selection device 103 and a face image processing device 104.

The camera 101 is for capturing video images of an eye of a naturally moving animal, such as a human being, a horse or a cow, in consecutive image frames. The images captured by the camera 101 are digitized and transferred to the image memory 105 per frame.

The light source 102 is capable of outputting light for suppressing an influence of light from the surroundings, such as sunlight or room light, to as small a level as possible, or for supplement when the quantity of light from the surroundings is insufficient. The light source 102 is disposed in the neighborhood of the camera 101. Further, the eye image selection device 103 prestores shape data about the light source 102.

The image memory 105 temporarily stores the digitized input images from the cameral 101 per frame.

The eye image selection device 103 processes per frame the consecutive input images from the image memory 105 to determine whether the processed one-frame image adequately includes the eye, and transfers the image, determined to adequately include the eye, to the face image processing device 104.

The face image processing device 104 carries out a face image process, such as gaze detection or individual identification, relative to the image selected by the eye image selection device 103. Upon failure in the face image process (for example, when the gaze is not detected or when an individual is not identified), the face image processing device 104 requests the eye image selection device 103 to transfer another image. This transfer request is repeated until the identification process is successfully carried out.

In this embodiment, the eye image selection device 103 selects an image to be given to the face image processing device 104 by utilizing a specular reflection image in the eye which is produced by high reflectance of the light source 102 on the cornea.

A specular reflection is a reflection whose reflectance approximates total reflection such as reflection by a mirror.

Figure 10:
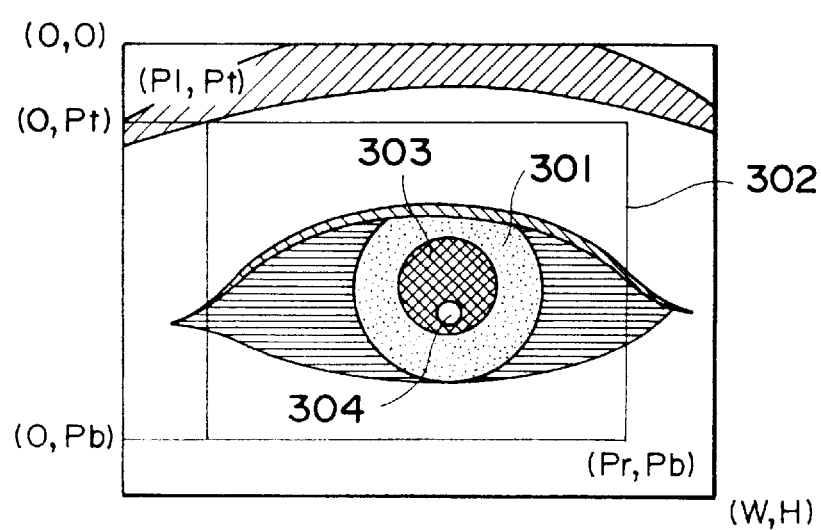
FIG. 10 is a diagram showing an image of an eye for explaining a specular reflection image of a light source.

Now, referring to FIG. 10, a region of a specular reflection image produced by the light source 102 and existing in an image including an eye will be explained. FIG. 10 shows an excellent image including an eye. The image is displayed on a coordinate plane with the origin (0, 0) at the upper left and coordinates (W, H) at the lower right.

Figure 11A:
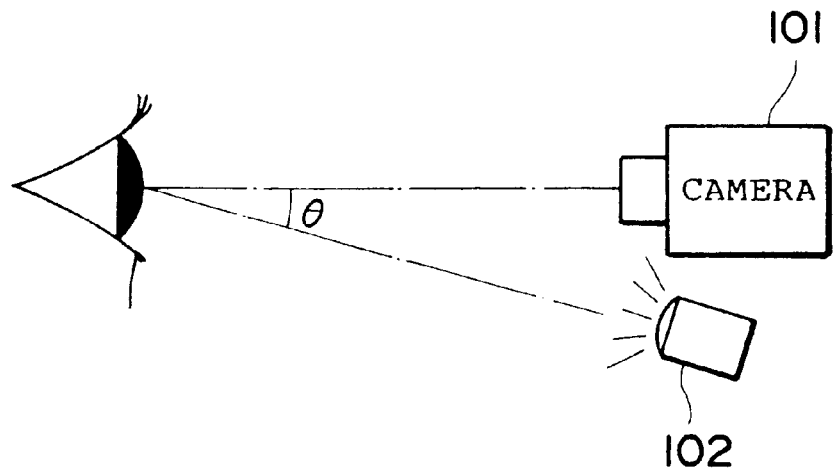
FIGS. 11A to 11C are diagrams for explaining the position of the specular reflection image with respect to a positional relationship between a camera and the light source.

The eye includes a pupil 303 having the lowest density (luminance) and an iris 301 having a higher density. A specular reflection image 304 produced by the light source 102 on the cornea exists near the center of the eye. The specular reflection image 304 appears at a position more distant from the center of the eye as the light source 102 is more distanced from a straight line between the camera 101 and an object to be captured, that is, as an angle θ in FIG. 11A becomes greater. In this embodiment, the light source 102 is disposed in the neighborhood of the camera 101. Accordingly, in the ideal image shown in FIG. 10, the specular reflection image 304 appears at the approximately center of the eye, that is, in a region of the pupil 303.

Figure 11B:
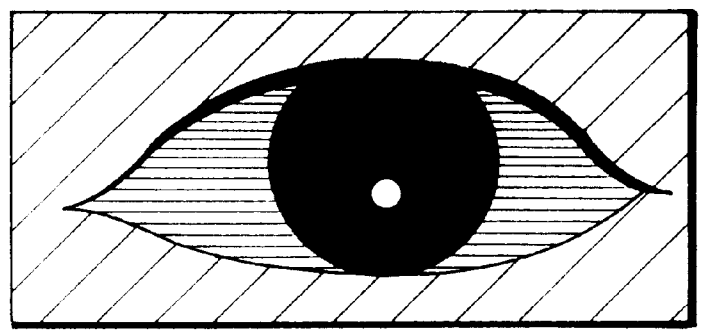
Figure 11C:
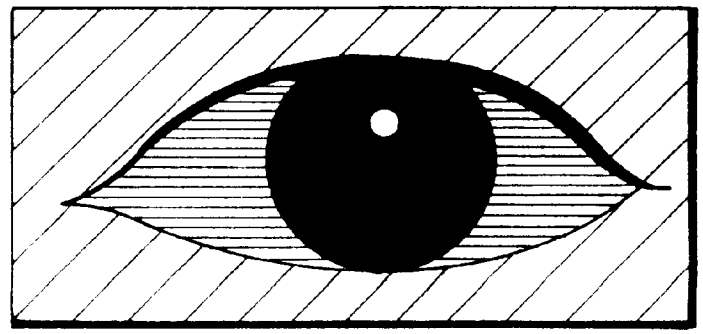

Further, when the light source 102 is disposed below the cameral 101 as shown in FIG. 9, the specular reflection image 304 appears below the center of the eye as shown in FIG. 11B. On the other hand, when the light source 102 is disposed above the camera 101, the specular reflection image 304 appears above the center of the eye as shown in FIG. 11C.

As described above, a positional relationship between the center of the eye and the specular reflection image 304 is determined based on a positional relationship between the camera 101 and the light source 102. In this embodiment, the eye image selection device 103 carries out the selection process on the assumption that the light source 102 is disposed below the camera 101.

The specular reflection image 304 of the light source 102 has the greatest density value in the image. Further, since the surface of an eyeball is spherical, if the focal point of the camera 101 falls on the surface of the eyeball to achieve a distinct image, the specular reflection image 304 has a very large density value in the image, and further, it takes a circular shape of a constant size if the light intensity of the light source 102 and the distance between the camera 101 and an object to be captured are approximately constant and if the light source 102 is spherical, such as a halogen lamp or the like.

On the other hand, specular reflection images of the light source 102 may also appear at portions where reflectance is high, such as tears at cathi: (i.e., where the upper and lower eyelids meet), fats on the skin and sweat. However, in this case, since the canthi and the skin are not spherical, the shapes of the specular reflection images may be non-circular or the sizes thereof may be largely changed.

In this embodiment, the eye image selection device 103 determines, based on the foregoing characteristic of the specular reflection image 304, whether the image is a distinct image including the eye, and carries out the selection of the image.

Figure 8:
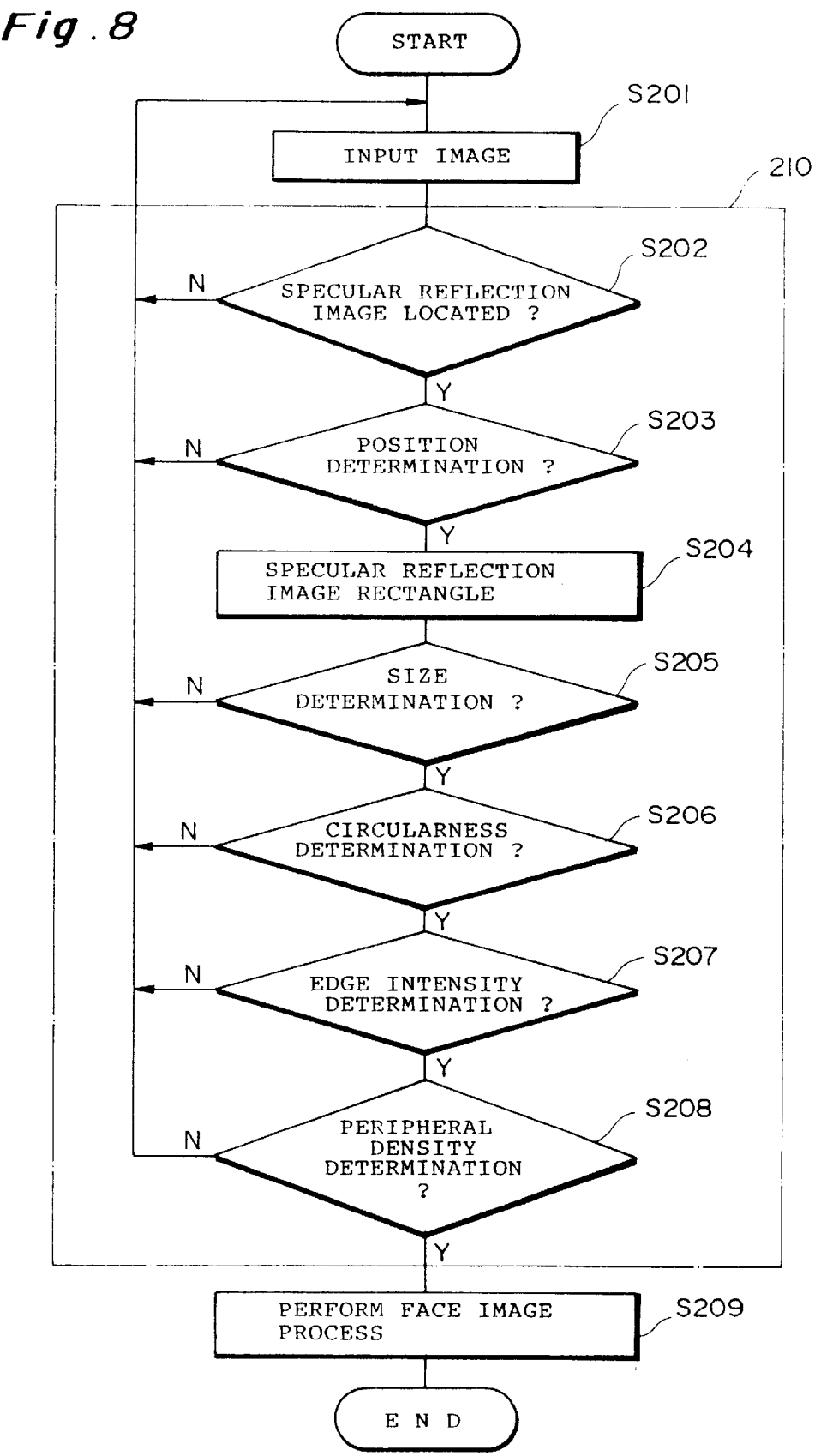
FIG. 8 is a flowchart showing an eye image selection method according to a third preferred embodiment of the present invention.

FIG. 8 is a flowchart showing the operation of the eye image selection device 103 or an eye image selection method in the image face processing system.

First at step S201, video images (consecutive images) captured by the camera1 101 are digitized and transferred to the image memory 105 per frame.

Then, the eye image selection device 103 carries out an eye image selection process 210. Specifically, through steps S202 to S208, the eye image selection device 103 evaluates a one-frame image obtained from the image memory 105 using various evaluation conditions relating to characteristics of the specular reflection image 304. The evaluation of the image is performed one by one with respect to the evaluation conditions and, if even one of the conditions is not satisfied, subsequent evaluation of the image is not carried out in this embodiment. Thus, the routine returns to step S201 for requesting an input of another image, and only such an image satisfying all the evaluation conditions is transferred to the face image processing device 104 to be subjected to the face image process at step S209.

The eye image selection device 103 sets the following six conditions as evaluation criteria for determining whether to select the image or not:

CONDITION 1

The specular reflection image 304 exists in the image (step S202);

CONDITION 2

The specular reflection image 304 exists in a preset range in the image (step S203);

CONDITION 3

The size of the specular reflection image 304 is within a preset range (step S205);

CONDITION 4

The shape of the specular reflection image 304 approximates to a circle (step S206);

CONDITION 5

A contour edge intensity of the specular reflection image 304 is not less than a reference value (step S207);

CONDITION 6

The density around the specular reflection image 304 is not greater than a reference value (step S208).

In this embodiment, if even one of the foregoing conditions 1 to 6 is not satisfied, the evaluation of the input image is finished that instant and inputting of another image is requested. Further, for determining the condition 3, step S204 executes a process of setting a minimum rectangle which encloses the specular reflection image 304.

Hereinbelow, determination methods relative to the foregoing conditions 1 to 6 will be described in detail.

CONDITION 1

As described above, the specular reflection Image 304 of the light source 102 has the greatest density value in the image and, depending on the light intensity of the light source 102 and a distance between the light source 102 and the eye, it has density values greater than a certain value. Thus, on condition that the light intensity Lp and the distance Ld are approximately constant, a density threshold value $T_{LpLd}$ of the specular reflection image 304 is set and, if a pixel having a density value exceeding the threshold value $T_{LpLd}$ exists in the image, it is determined that the condition 1 is satisfied. Specifically, the condition 1 can be given by:

$$\text{Est. } (In(x, y), [\text{Condition 1}]) = \text{TRUE (when } x, y \text{ satisfying } In(x, y) > T_{LpLd} \text{ exist}) = \text{FALSE (when } x, y \text{ satisfying } In(x, y) > T_{LpLd} \text{ do not exist)} \qquad (8)$$

wherein $In(x, y)$ ($0 \leq x < W$, $0 \leq y < H$) represents a density value of a pixel $(x, y)$ of an input image, and Est. $(In(x, y), [\text{Condition 1}])$ means evaluating an input image $In(x, y)$ to determine whether it satisfies the condition 1.

If Est. $(In(x, y), [\text{Condition 1}]) = \text{TRUE}$, the input image $In(x, y)$ satisfies the condition 1 and, if Est. $(In(x, y), [\text{Condition 1}]) = \text{FALSE}$, the input image $In(x, y)$ does not satisfy the condition 1.

CONDITION 2

Using the threshold value $T_{LpLd}$ in the condition 1, the density values $In(x, y)$ of the input image $In(x, y)$ are two-valued (e.g., one or zero) can be used to obtain a two-valued image $D(x, y)$ having pixel values $D(x, y)$ as given by:

$$D(x, y) = 1 (\text{when } In(x, y) > T_{LpLd}) = 0 (\text{when } In(x, y) \leq T_{LpLd}) \qquad (9)$$

Further, labeling is carried out relative to the two-valued pixels whose $D(x, y)$ are 1. Assuming that $D(x, y)=1$ in black regions in FIG. 12A, the labeling is carried out as shown in FIG. 12B, that is, by assigning the same labels to a pixel whose $D(x, y)$ is 1 and an adjacent pixel whose $D(x, y)$ is also 1.

Then, among the labeled regions each defined by the same labels, such a labeled region including a pixel In(xmax, ymax) having the greatest density value Dmax in the input image $In(x, y)$ is set to be a specular reflection image region (Arf) 401 (see FIG. 14), and coordinates of the center of gravity in this region are set to Gn(xgrv, ygrv).

Figure 13A:
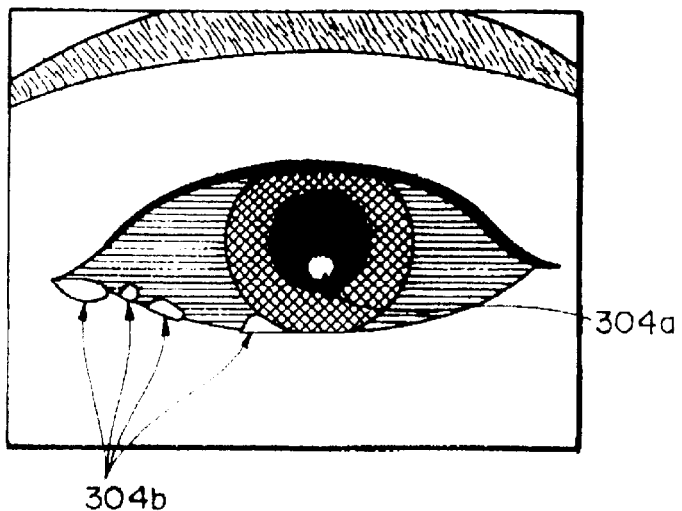
FIGS. 13A to 13C are diagrams for explaining a method of locating a specular reflection image appearing on the cornea.

Alternatively, the specular reflection image region (Arf) 401 may be located in the following manner:

As described above, the specular reflection images of the light source 102 may also appear at portions where reflectance is high, such as tears at canthi, fats of the skin and sweats. For example, as shown in FIG. 13A, a specular reflection image on the cornea is denoted by 304a, while specular reflection images due to tears or the like are denoted by 304b. Each of the specular reflection image rectangles is a candidate region for containing the image 304.

On the condition that an image of an eye is captured, the specular reflection image 304a on the cornea has the following features:

FEATURE 1

No other specular reflection images exist in the neighborhood of the specular reflection image 304a;

FEATURE 2

Due to the presence of the pupil, the mean density value around the specular reflection image 304a is small.

Based on the foregoing features (1) and (2), the specular reflection image 304a is located as the Arf 401 among the specular reflection images in the input image through the following processes:

PROCESS 1

Figure 12A:
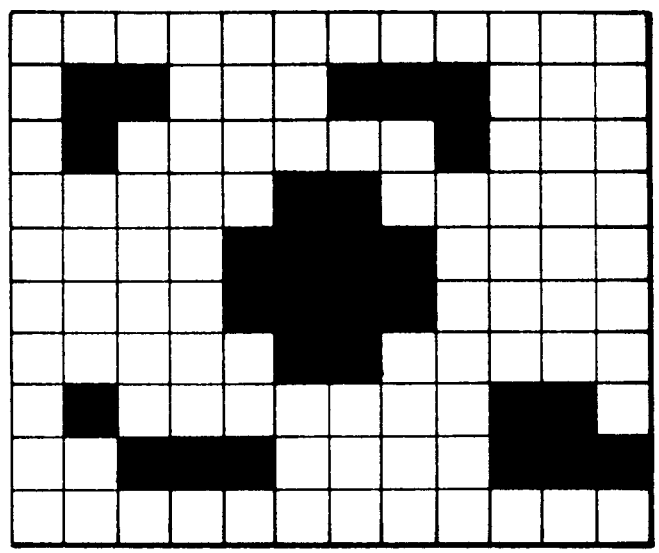
FIGS. 12A and 12B are diagrams for explaining a method of locating regions of specular reflection images.
Figure 12B:
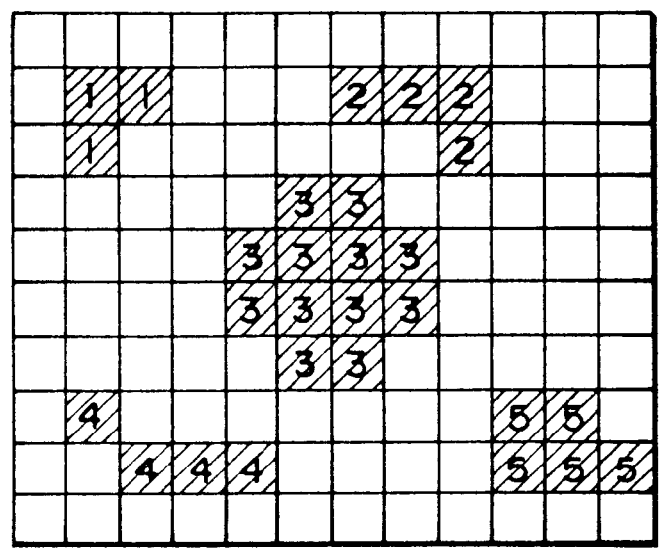
Figure 13B:
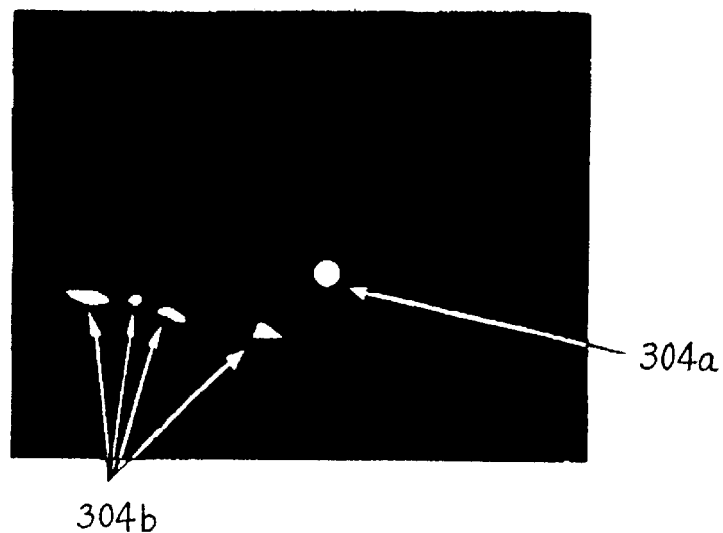

Using the threshold value $T_{pLd}$ in the condition 1, the input image shown in FIG. 13A is two-valued as in FIGS. 12A and 12B so as to obtain a two-valued image shown in FIG. 13B. As will be appreciated, white regions in FIG. 13B have density values greater than $T_{LpLd}$ and represent regions of the specular reflection images 304a and 304b.

PROCESS 2

Figure 13C:
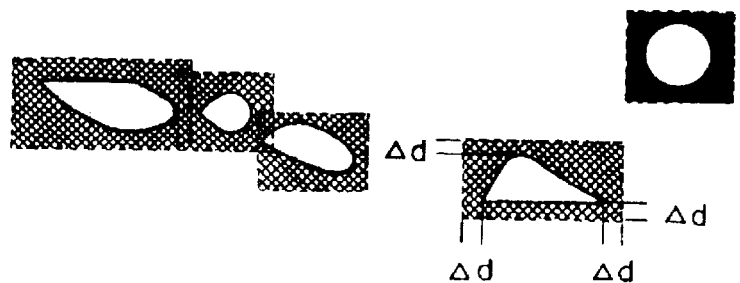

Each of the specular reflection image regions shown in FIG. 13B is enclosed by a rectangle having predetermined constant margins Δd in four (up, down, right and left) directions. This rectangle is called a specular reflection image rectangle. FIG. 13C shows enlarged images of the specular reflection image rectangles enclosing the corresponding specular reflection image regions. Each of the specular reflection image rectangles is a candidate region for containing the image 304.

PROCESS 3

If the specular reflection image rectangles are overlapped with each other, those overlapped rectangles are excluded since none of them might enclose the specular reflection image 304a on the cornea. This process is based on the foregoing feature (1).

PROCESS 4

With respect to the specular reflection image rectangles not excluded in Process 3, a mean density value of a region other than the specular reflection image region in each specular reflection image rectangle is calculated. Then, the specular reflection image rectangle having the smallest calculated mean density value is determined as enclosing the specular reflection image 304a. This process is based on the foregoing feature (2).

In this manner, the region of the specular reflection image 304a is located and set to be the Arf 401.

On the other hand, a reflection allowable region 302 (see FIG. 10) is preset relative to the input image. Specifically, if the center of the eye is located far away from the center of the input image, it is possible that the eye protrudes from the input image. If that is the case, an adequate result can not be obtained by processing such an image. For this reason, the foregoing reflection allowable region 302 is set in this embodiment. As shown in FIG. 10, if coordinates at the upper left of the reflection allowable region 302 are set to (Pl, Pt) and coordinates at the lower right thereof are set to (Pr, Pb), the condition 2 can be given by:

$$\text{Est. (In}(x, y), [\text{Condition 2}])=\text{TRUE (when } Pl \leq xgrv \leq Pr \text{ and } Pt \leq ygrv \leq Pb)=\text{FALSE (otherwise)} \quad (10)$$

In the foregoing evaluation criterion, it may be arranged not to use the positional data of Gn(xgrv, ygrv), but to use the positional data of the pixel In(xmax, ymax) with the greatest density value. In this case, the condition 2 can be given by:

$$\text{Est. (In}(x, y), [\text{Condition 2}])=\text{TRUE (when } Pl \leq xmax \leq Pr \text{ and } Pt \leq ymax \leq Pb)=\text{FALSE (otherwise)} \quad (11)$$

CONDITION 3

As described above, if the light intensity of the light source 102 and the distance between the camera 101 and the eye are approximately constant, the specular reflection image 304 of the light source 102 approximates to a circular shape of a constant size. Accordingly, the condition 3 uses the size of the specular reflection image 304 as an evaluation criterion.

Figure 14:
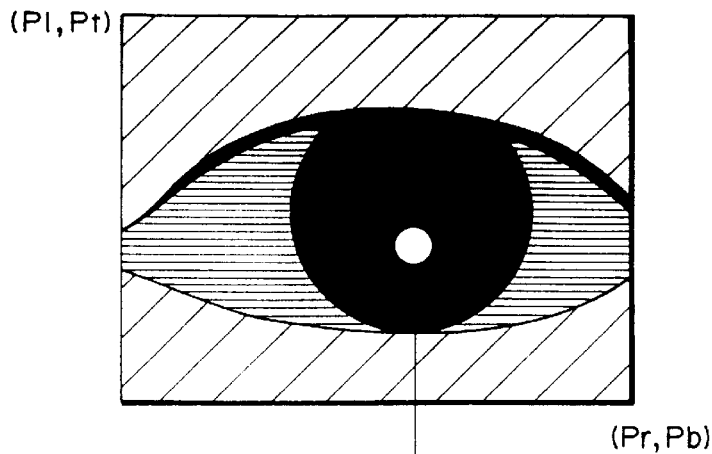
FIG. 14 is a diagram for explaining an evaluation method using the specular reflection image.

A rectangle enclosing the Arf 401 of the two-valued image D(x, y) obtained in the process of the condition 2 is set to be a specular reflection image rectangle (Rrf) 402 (see FIG. 14). The width and the height of the Rrf 402 are set to Wr and Hr, respectively. If each of values Wr and Hr is within a preset allowable range for the diameter of the specular reflection image 304, the condition 3 is satisfied. Specifically, the condition 3 can be given by:

$$\text{Est. (In}(x, y), [\text{Condition 3}])=\text{TRUE (when } DMmin \leq Wr \leq DMmax \text{ and } DMmin > Hr \leq DMmax)=\text{FALSE (otherwise)} \quad (12)$$

wherein DMmin and DMmax represent minimum and maximum values of the preset allowable range of the diameter of the specular reflection image 304.

CONDITION 4

Since the surface of an eyeball is spherical, if the focal point of the camera 101 falls on the surface of the eyeball and if the eye is oriented forward, the shape of the specular reflection image 304 of the light source 102 approximates to a circle. Accordingly, an evaluation criterion of the condition 4 determines whether the specular reflection image 304 approximates to a circle or not. The condition 4 can be given by:

$$\text{Est. (In}(x, y), [\text{Condition 4}])=\text{TRUE (when Circle(Arf)}>Tc)=\text{FALSE (otherwise)} \quad (13)$$

wherein Tc is a threshold value and set to, for example, about 0.5 to 1.0, and Circle(Arf) represents circularness of the Arf 401 or an approximation of the Arf 401 relative to a circle in a numerical value and is given by:

$$\text{Circle(Arf)}=4\pi \times (\text{area(Arf)}/(\text{circ(Arf)})^2 \quad (14)$$

wherein area(Arf) represents the area of the Arf 401 and circ(Arf) represents a circumferential length of the Arf 401.

If the Arf 401 is circular, the approximation Circle(Arf) becomes 1.0.

CONDITION 5

If the focal point of the camera 101 falls on the surface of the eyeball, the specular reflection image 304 of the light source 102 appears distinctly in the input image. Accordingly, an edge intensity at a circumferential edge of the specular reflection image 304 becomes large. The condition 5 uses the edge intensity of the specular reflection image 304 as an evaluation criterion. The condition 5 can be given by:

$$\text{Est. (In}(x, y), [\text{Condition 5}])=\text{TRUE (when Edge(Arf)}>Te)=\text{FALSE (otherwise)} \quad (15)$$

wherein Edge(Arf) represents an edge intensity of the Arf 401 and Te represents a threshold value.

Figure 15A:
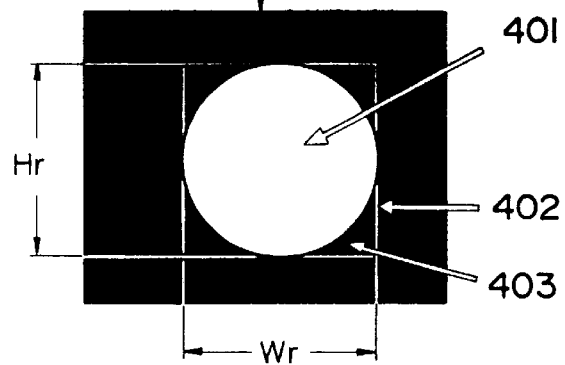
FIGS. 15A and 15B are diagrams for explaining a method of deriving an edge intensity of the specular reflection image.
Figure 15B:
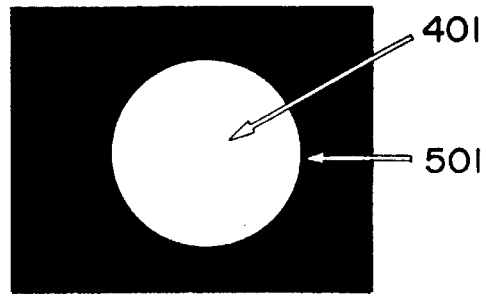

FIGS. 15A and 15B are diagrams for explaining a method of deriving the edge intensity Edge(Arf). In FIG. 15A, by two-valuing the image In(x, y) using a given threshold value, a set Erf of coordinates of a contour line 501 of the Arf 401 is derived as given by:

Erf=(EI (XeI, YeI), . . . , Ei (Xei, Yei), . . . , ENe (XeNe, YeNe)) (16)

wherein Ne represents the number of points constituting the contour line of the Arf 401, and Ei (Xei, Yei) (I≦i≦Ne) represent coordinates thereof.

FIG. 15B is an enlarged diagram of an image obtained by applying an edge intensifying process relative to the image In(x, y). The image shown in FIG. 15B is produced based on, for example, the Laplacian or Sobel edge intensifying process. In the edge intensified image, a value of each pixel is set to IEn(x, y) which takes a greater value as the edge intensity increases. The edge intensity Edge(Arf) of the Arf 401 represents the mean edge intensity of the contour line of the Arf 401 and can be derived by the following equation (17):

$$Edge(Arf) = \sum_{i=1}^{Ne} IEn(Xei, Yei)/Ne \quad (17)$$

CONDITION 6

If the light source 102 is located in the neighborhood of the camera 101 and the eye is oriented forward, the specular reflection image 304 of the light source 102 appears near the center of the eye, that is, at the pupil of the eye. Since the pupil absorbs the light, the density thereof is the lowest in the image. Therefore, the condition 6 evaluates the image to determine whether the eye is oriented forward, and uses a mean density value around the specular reflection image 304 as an evaluation criterion. Specifically, the condition 6 can be given by:

Est. (In(x, y), [Condition 6])=TRUE (when Dens(Crf)<Te)=
FALSE (otherwise)   (18)

wherein Dens(Crf) represents a mean density value around the Arf 401, and Td represents a threshold value.

In FIG. 14, a region other than the Arf 401 in the specular reflection image rectangle (Rrf) 402 is shown as a specular reflection image peripheral region (Crf) 403. The Crf 403 can be given by:

Crf=(Xci, Yci)(i=1 to Nc)   (19)

wherein Nc represents the number of pixels constituting the Crf 403.

Then, the peripheral mean density value Dens(Crf) is given by:

$$Dens(Crf) = \sum_{i=1}^{Nc} In(Xci, Yci)/Nc \quad (20)$$

Based on the foregoing conditions 1 to 6, the eye image selection device 103 selects the image to be given to the face image processing device 104.

According to the foregoing third preferred embodiment, from among a plurality of images of an animal, such as a human being, a horse or a cow, captured during natural movement thereof, only such an image which includes an eye at the center thereof and is distinct enough for use in face image processing can be automatically selected as an image including necessary data for the individual identification process, by paying attention to the specular reflection image 304 of the light source 102.

As a result, the process time for the whole face image processing system can be shortened, and further, the accuracy of the identification process can be improved.

In the foregoing third preferred embodiment, the conditions 1 to 6 are evaluated in the order named. However, the evaluation order is not limited thereto.

Further, the requirements of the face image processing device relative to the selected image are not so strict, one or more of the conditions 1 to 6 may be from the evaluation criteria.

In the foregoing third preferred embodiment, the input image captured by the camera 101 is processed as it is. However, the input image may be reduced in size in advance and then processed in the same manner. In this case, the image selection can be carried out at high speed.

In the foregoing third preferred embodiment, only one eye is used for the image selection. However, it may be arranged that image selection based on specular reflection images is carried out with respect to both eyes. Further, a plurality of light sources may be provided. In this case, the number of specular reflection images may be used as an evaluation criterion.

In the foregoing third preferred embodiment, the system performs essentially real-time image selection from images captured by the camera. However, a plurality of images captured at a distant place and stored in a storage medium may be used for image selection.

If real-time selection is not required, an evaluation score may be given per item of the foregoing conditions and the weighted sum of the evaluation scores may be derived as the total score per input image so that the image with the highest total score may be selected. Specifically, from the images satisfying the foregoing conditions 1 to 6, the optimum image may be selected.

In the foregoing third preferred embodiment, the shape of the light source 102 is spherical. However, since the shape of the specular reflection image 304 depends on the shape of the light source 102, if the shape of the light source 102 is not spherical, the foregoing explanation relating to "circular shape" of the specular reflection image 304 may be changed adequately according to the shape of the light source 102.

While the present invention has been described in terms of the preferred embodiments, the invention is not to be limited thereto, but can be embodied in various ways without departing from the principle of the invention as defined in the appended claims.

What is claimed is:

1. An eye image selection method comprising the steps of:
   locating a center position of a pupil of an eye from an input image including the eye; and
   determining that, if a distance between the center position of said pupil and a center position of said input image is not greater than a preset value, said input image includes necessary eye data for carrying out individual identification, and selecting said input image,
   wherein said step of locating a center position of a pupil comprises:
   dividing said input image into a plurality of blocks;
   producing a mosaic image with said blocks each representing a density value; and
   determining that one of said blocks, having a small distance from a center point of said mosaic image and having a small density value, is a block including said center position of said pupil of said eye.

2. The method according to claim 1, wherein said step of locating a center position of a pupil further comprises:

setting a threshold value based on the density value of said determined block;

converting said input image into a two-valued image using said threshold value as a criterion; and extracting, as a pupil region, a region of said two-valued image including the center position of said pupil.

3. An eye image selection method comprising the steps of:

locating a center position of a pupil of an eye from an input image including the eye; and determining that, if a distance between the center position of said pupil and a center position of said input image is not greater than a preset value, said input image includes necessary eye data for carrying out individual identification, and selecting said input image, wherein said steps of locating a center position of a pupil comprises:

dividing said input image into a plurality of blocks;

producing a mosaic image with said blocks each representing a density value;

determining one of said blocks as having a small distance from a center point of said mosaic image and having a small density value; and locating the center position of said pupil based on said determined block.

4. An eye image selection method comprising the steps of:

locating a center position of a pupil of an eye from an input image including the eye; and determining that, if a density of a region including said center position is not greater than a given value, said input image includes said pupil for carrying out individual identification, and selecting said input image, wherein said step of locating a center position of a pupil comprises:

dividing said input image into a plurality of blocks;

producing a mosaic image with said blocks each representing a density value;

determining one of said blocks as having a small distance from a center point of said mosaic image and having a small density value; and locating the center position of said pupil based on said determined block.

5. An eye image selection method comprising the steps of:

locating a center position of a pupil of an eye from an input image including the eye, said step of locating a center position of a pupil including dividing an input image including an eye into a plurality of blocks, producing a mosaic image with said blocks each representing a density value, determining that one of said blocks, having a small distance from a center point of said mosaic image and having a small density value, is a block including said center position of said pupil, and locating the center position of said pupil from said determined block; and selecting said input image for carrying out individual identification if a distance between the center position of said pupil and a center position of said input image is not greater than a preset value and if a density of a region including the center position of said pupil is not greater than a preset value.

* * * * *